(No Model.)
A. H. BOCK.
JOURNAL BEARING FOR VELOCIPEDES.
No. 333,592. Patented Jan. 5, 1886.
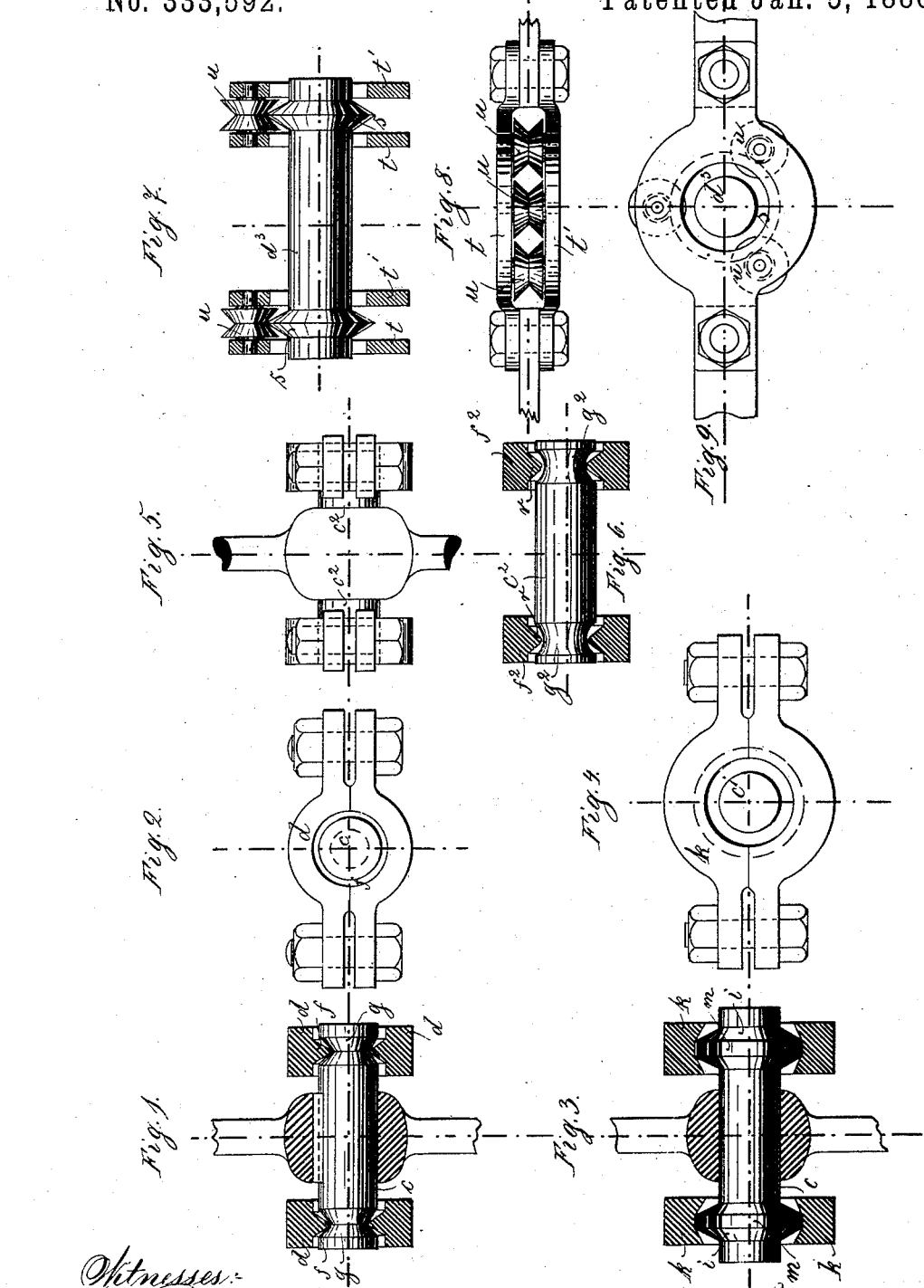

UNITED STATES PATENT OFFICE.

ANTON HEINRICH BOCK, OF MEISSEN, SAXONY, GERMANY.

JOURNAL-BEARING FOR VELOCIPEDES.

SPECIFICATION forming part of Letters Patent No. 333,592, dated January 5, 1886.

Application filed December 20, 1884. Serial No. 150,863. (No model.)

*To all whom it may concern:*

Be it known that I, ANTON HEINRICH BOCK, a subject of the King of Saxony, a resident of the city of Meissen, Saxony, German Empire, have invented new and useful Improvements in the Construction of Axle-Journals for Use on Velocipedes, Cars, and for Similar Purposes, of which the following is a specification.

The improvements hereinafter described relate to the bearings for the shafts or axles of velocipedes, sporting-vehicles, and similar light carriages, and have for their object to reduce friction to a minimum, thereby obtaining that the vehicles run as easily as may be.

In the drawings the principal forms in which this invention may be carried into effect are shown, *videlicet:*

Figure 1 shows the axle or shaft mounted on half-rings, having a sharp-edged wedge-shaped collar or rim, $d$, and engaging with suitable grooves in the axle; Fig. 2, an elevation of this arrangement. Figs. 3 and 4 show a modification of this arrangement, in which wedge-shaped rings are provided on the axle and run in suitably-recessed bearings. Figs. 5 and 6 show a construction in which the journals of the axle are made with grooves forming a segment of a circle in cross-section, and the bearing is provided with a wedge-shaped rim or interior collar, the ridge of which is somewhat rounded off. Figs. 7, 8, and 9 show a roller-bearing constructed according to this system. In this also wedge-shaped collars or rings on the shaft run in suitably-shaped rollers.

In Figs. 1 and 2, $c$ is a shaft or axle, such as used, say, in velocipedes and sporting-vehicles. $d$ are annular bearings, which at $f$ have a ridge, which is of a keen wedge shape in cross-section, and encircles the groove $g$, provided in the shaft $c$. This groove $g$ is also wedge-shaped in section; and it has to be specially observed that the sides or faces of the wedge-shaped groove $g$ on shaft $c$ inclose a greater angle than the faces of the rib or collar $f$ of the ring-bearing $d$, so that contact of these parts takes place only at the point of the rib $f$—*videlicet*, the deepest part of groove $g$—and that by reason of the small surfaces which are in contact friction is reduced to a minimum, (Figs. 1 and 2.) A modification of this arrangement is shown in Figs. 3 and 4. Here the axle or shaft $C'$ is furnished with wedge-shaped collars or rings $i$, which are either turned to a sharp edge or may have a small flat face, $m$, at the bearing part. The bearing $k$ is suitably recessed in such a manner that lubrication may readily be effected.

The modification shown in Figs. 5 and 6 shows a shaft or axle, $c^2$, having at the bearing parts a groove, $g^2$, forming a segment of a circle in section, and the ring-bearing has a rib, $f^2$, analogous to that described with reference to Figs. 1 and 2, with the difference, however, that the point of the encircling rib $f^2$ is somewhat rounded at the bearing part $r$.

Figs. 7, 8, and 9 show an axle or shaft, $d^3$, which has raised rings or collars $s$, as described with reference to Figs. 3 and 4, the cross-section of which forms an either pointed or somewhat rounded wedge. Two rings, $t\ t'$, Figs. 7, 9, surround the collar $s$, and in these rings are mounted three or more small rollers, $u\ u\ u$, the peripheries of which are channeled or grooved to correspond with the wedge shape of the collar $s$, in a similar manner as described with reference to Figs. 1 and 2—*videlicet*, so that the side surfaces of the grooves of the rollers $a$ inclose a wider angle than the faces of the wedge-shaped rings or collars $s$, Fig. 7. In this roller-bearing also contact of the contact-surfaces takes place in one point only—*videlicet*, where the collar or ring $s$ touches the roller $a$, which is placed vertically, and directly over it. In Fig. 9 this point is marked $x$, and the other rollers, $u$, serve merely to guide the axle or shaft securely, or to maintain it in its correct relation to the roller $u$ at the top. The bearing may be fixed on, say, a sporting-vehicle in any convenient manner, which requires no description.

As to Figs. 7, 8, and 9, it may be observed that the upper roller must always be perpendicular to the collar $s$ of the shaft $d^3$, so as to have the contact-point at $x$, whereby easy running is obtained.

I claim—

1. Bearings for the axles of light-running vehicles, consisting in the combination, with the axle and its bearing, of angular bearing-surfaces, the angles of which differ, one of said bearing-surfaces being formed by a re-entrant and the other by a salient angle, substantially as described, for the purpose specified.

2. Bearings for the axles of light-running vehicles, consisting in the combination, with the axle and its bearing, of wedge-shaped bearing-surfaces, the angles of which differ, one of said bearing-surfaces being formed by a re-entrant and the other by a salient angle, and one of said bearing-surfaces having a rolling motion, substantially as described, for the purpose specified.

3. Bearings for the axles of light-running vehicles, consisting in the combination, with the axle and its bearing, of angular bearing-surfaces, the angles of which differ, one of said bearing-surfaces being formed by a re-entrant and the other by a salient angle, both having their apices rounded off, substantially as described, for the purpose specified.

In testimony whereof I have hereto set my hand in the presence of two subscribing witnesses.

ANTON HEINRICH BOCK.

Witnesses:
ALEX. SCHOLZE,
B. ROI.